United States Patent
Fritts et al.

(10) Patent No.: US 12,345,069 B2
(45) Date of Patent: Jul. 1, 2025

(54) DECK OR SLAB ANCHOR HOUSING POWER SUPPLY FOR POOL AND OTHER HIGH-MOISTURE OPERATING ENVIRONMENT POWERED DEVICES

(71) Applicant: S.R. SMITH, LLC, Canby, OR (US)

(72) Inventors: Brett C. Fritts, West Linn, OR (US); William J. Svendsen, Canby, OR (US); Gregory D. Russell, Canby, OR (US)

(73) Assignee: S.R. SMITH, LLC, Canby, OR (US)

( * ) Notice: Subject to any disclaimer, the term of this patent is extended or adjusted under 35 U.S.C. 154(b) by 173 days.

(21) Appl. No.: 17/755,714

(22) PCT Filed: Nov. 6, 2020

(86) PCT No.: PCT/US2020/059544
§ 371 (c)(1),
(2) Date: May 5, 2022

(87) PCT Pub. No.: WO2021/092493
PCT Pub. Date: May 14, 2021

(65) Prior Publication Data
US 2022/0396959 A1    Dec. 15, 2022

Related U.S. Application Data

(60) Provisional application No. 62/931,695, filed on Nov. 6, 2019.

(51) Int. Cl.
*E04H 4/14* (2006.01)
*F21V 33/00* (2006.01)
*H02J 50/10* (2016.01)

(52) U.S. Cl.
CPC ............... *E04H 4/14* (2013.01); *H02J 50/10* (2016.02); *F21V 33/006* (2013.01)

(58) Field of Classification Search
CPC .......... E04H 4/14; H02J 50/10; F21V 33/006; F21V 33/008; F21W 2111/08; F21Y 2115/10
(Continued)

(56) References Cited

U.S. PATENT DOCUMENTS

| 4,133,154 A | 1/1979 | Ruzicka |
| 9,192,501 B2 * | 11/2015 | Fridez ................... A61F 5/0059 |

(Continued)

FOREIGN PATENT DOCUMENTS

| CN | 209587769 U | 11/2019 |
| CN | 215695257 U * | 2/2022 ............. B05B 17/08 |

(Continued)

OTHER PUBLICATIONS

International Search Report and Written Opinion for International PCT Application No. PCT/US2020/059544, mailed Feb. 8, 2021, 8 pages.

*Primary Examiner* — Lori L Baker
(74) *Attorney, Agent, or Firm* — Kilpatrick Townsend & Stockton LLP (57) ABSTRACT

Embodiments of the present disclosure include an anchor assembly configured for installation in a high-moisture environment, comprising an engaging compartment configured to receive a powered accessory and damper vibrations associated with the powered accessory, and a coupling portion housing a power supply, wherein the power supply is configured to provide wireless power to the powered accessory located in the engaging compartment.

22 Claims, 7 Drawing Sheets

(58) Field of Classification Search
USPC ........................................ 4/496, 488; 482/55
See application file for complete search history.

(56) References Cited

U.S. PATENT DOCUMENTS

| | | | |
|---|---|---|---|
| 9,544,964 B2 | 1/2017 | Li | |
| 9,587,769 B2 * | 3/2017 | Ishikawa | B60H 1/00571 |
| 10,938,245 B1 * | 3/2021 | Sanson | F21V 23/06 |
| 11,296,551 B2 * | 4/2022 | Sanson | H02J 7/0042 |
| 11,633,077 B2 * | 4/2023 | Laundre | A47K 13/12 |
| | | | 4/496 |
| 2005/0159275 A1 * | 7/2005 | Bullman | A63B 69/0035 |
| | | | 482/111 |
| 2006/0048294 A1 * | 3/2006 | Maguire | A61G 7/1059 |
| | | | 4/496 |
| 2009/0308018 A1 | 12/2009 | Svendsen | |
| 2015/0013059 A1 * | 1/2015 | Kelly | A61G 7/1005 |
| | | | 4/496 |
| 2016/0156217 A1 * | 6/2016 | Pitts | H02J 50/10 |
| | | | 320/108 |
| 2016/0323952 A1 * | 11/2016 | Li | H02J 50/12 |
| 2019/0297699 A1 * | 9/2019 | Goldman | E04H 4/148 |

FOREIGN PATENT DOCUMENTS

| | | | | |
|---|---|---|---|---|
| CN | 117263783 A | * | 12/2023 | |
| WO | 2018107428 A1 | | 6/2018 | |
| WO | 2020152615 A1 | | 7/2020 | |
| WO | WO-2020170001 A1 | * | 8/2020 | A61B 5/002 |

* cited by examiner

DECK OR SLAB ANCHOR HOUSING POWER SUPPLY FOR POOL AND OTHER HIGH-MOISTURE OPERATING ENVIRONMENT POWERED DEVICES

RELATED APPLICATION

This application is a National Stage of International Application No. PCT/US2020/059544, filed Nov. 6, 2020, which claims priority benefit of U.S. Provisional Patent Application No. 62/931,695, filed Nov. 6, 2019, which are hereby incorporated by reference in their entireties.

TECHNICAL FIELD

The present disclosure relates generally to deck, slab, or wall anchors having integrated power supplies used in high-moisture (e.g., humid, submerged, or wet) environments, and, more particularly, to housing power supplies employing electromagnetic inductive coupling for the wireless (contactless) transfer of power to an accessory inserted into it.

BACKGROUND INFORMATION

Conventional anchors are used to secure accessories such as pool rails and similar accessories typically deployed in high-moisture environments. For instance, anchors in a high-moisture environment may be positioned in flooring or a base on flooring, and a railing accessory can engage with the anchors to provide a handrail. In another example, anchors may be positioned underwater, such as underwater in a swimming pool or water feature, and a mechanical device, such as a pump, can be secured by each anchor to provide water circulation. In yet another example, anchors positioned underwater in pool or water feature walls can be configured to receive light fixtures illuminating the surrounding area.

Conventionally, in such high-moisture environments, different types of anchors are used to secure different accessories. For example, one type of anchor is used to secure handrails, another type is used to secure mechanical devices, and yet another type is used to secure light fixtures. This requirement is challenging and increases cost. Moreover, having to keep track of and install different anchor types is time consuming and inefficient during installation. Accordingly, the non-standardized nature of conventional anchors for high-moisture environments is a drawback.

Using a conventional anchor in high-moisture environments to electrically power an accessory can also be challenging. Conventional anchors are often not sized correctly to house power circuitry or accessory circuitry and incorporated devices. Conventional anchors also often fail to properly secure powered accessories. In addition, conventional anchors having power supplies often suffer from connectivity issues, with unreliable electrical connections between the anchor and powered accessory. Environmental hazards in high-moisture environments make connectivity susceptible to failure in many conventional anchors, which lack adequate housing that secures accessories or combats against dirt, water, and other contaminants. Such inadequate housing can be unsafe to use with electrical components in high-moisture environments. Finally, many conventional anchors are susceptible to vibrations, which also impacts power and data connectivity with powered accessories.

U.S. Pat. No. 9,544,964, assigned to S.R. Smith, LLC describes a novel inductive coupling system that, in one example, provides a lighting receptacle that distinguishes over conventional lighting receptacles. Another type of inductive coupling system is the subject of International Publication No. WO 2020/152615 A1. The '615 publication describes, among other things, power transfer through a T-shaped inductive coupler (referred to as PowerPass™ technology).

SUMMARY OF THE DISCLOSURE

The present disclosure describes embodiments providing a universal, standardized anchor assembly configured to accommodate non-powered accessories and powered accessories receiving power through a T-shaped inductive coupler. The present inventors have recognized that an anchor assembly suitable for both above ground and underwater deployments, including features to address several design challenges and provide safe electrical power to accessories in high-moisture electrical operating environments. For instance, anchors may have a relatively deep pocket to provide mechanical stability to secured devices and therefore the PowerPass technology is deployed at a relatively deep distance from an opening of the anchors.

Placing the PowerPass relatively deep in an above-ground installation, however, could result in adverse effects such as heat buildup (e.g., from bright LEDs) inside the pocket of the anchors. Accordingly, the present disclosure describes anchors addressing, among other things, such design challenges.

Additional aspects and advantages will be apparent from the following detailed description of embodiments, which proceeds with reference to the accompanying drawings.

DETAILED DESCRIPTION OF EMBODIMENTS

Figure 1:
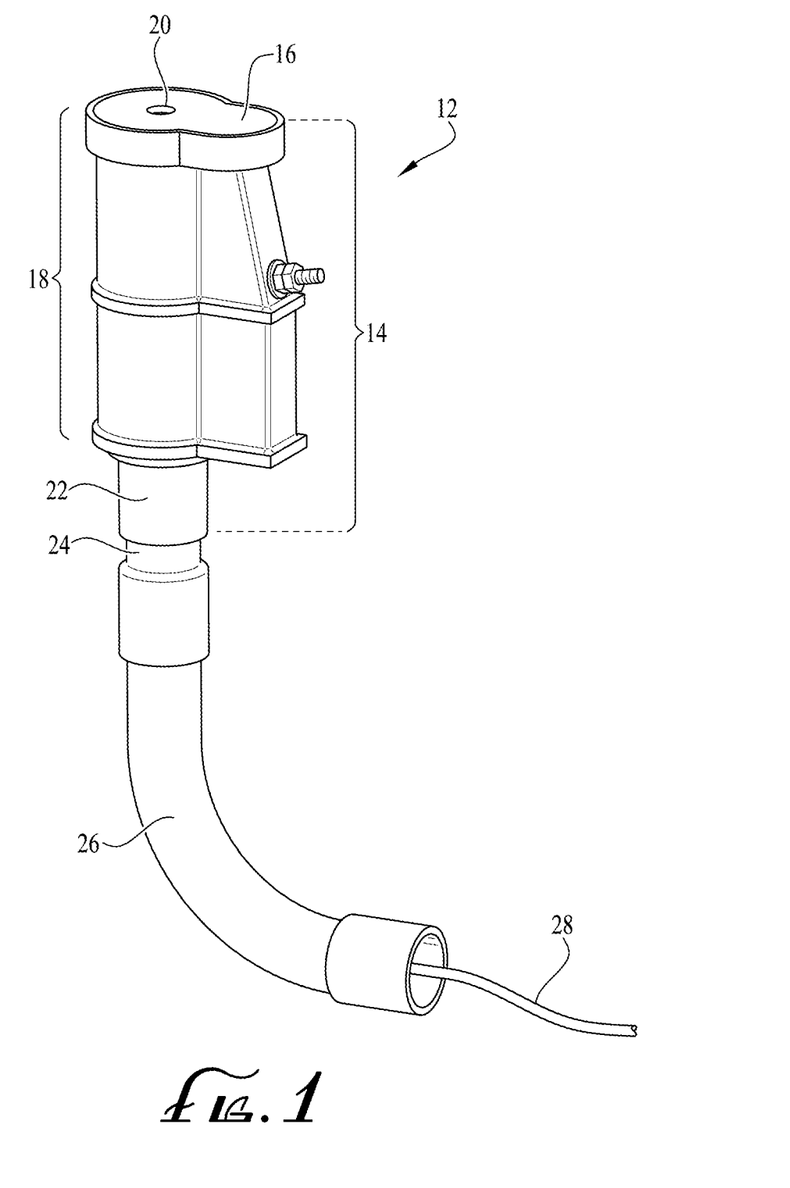
FIG. 1 is an isometric view of an anchor assembly, according to one embodiment.
Figure 2:
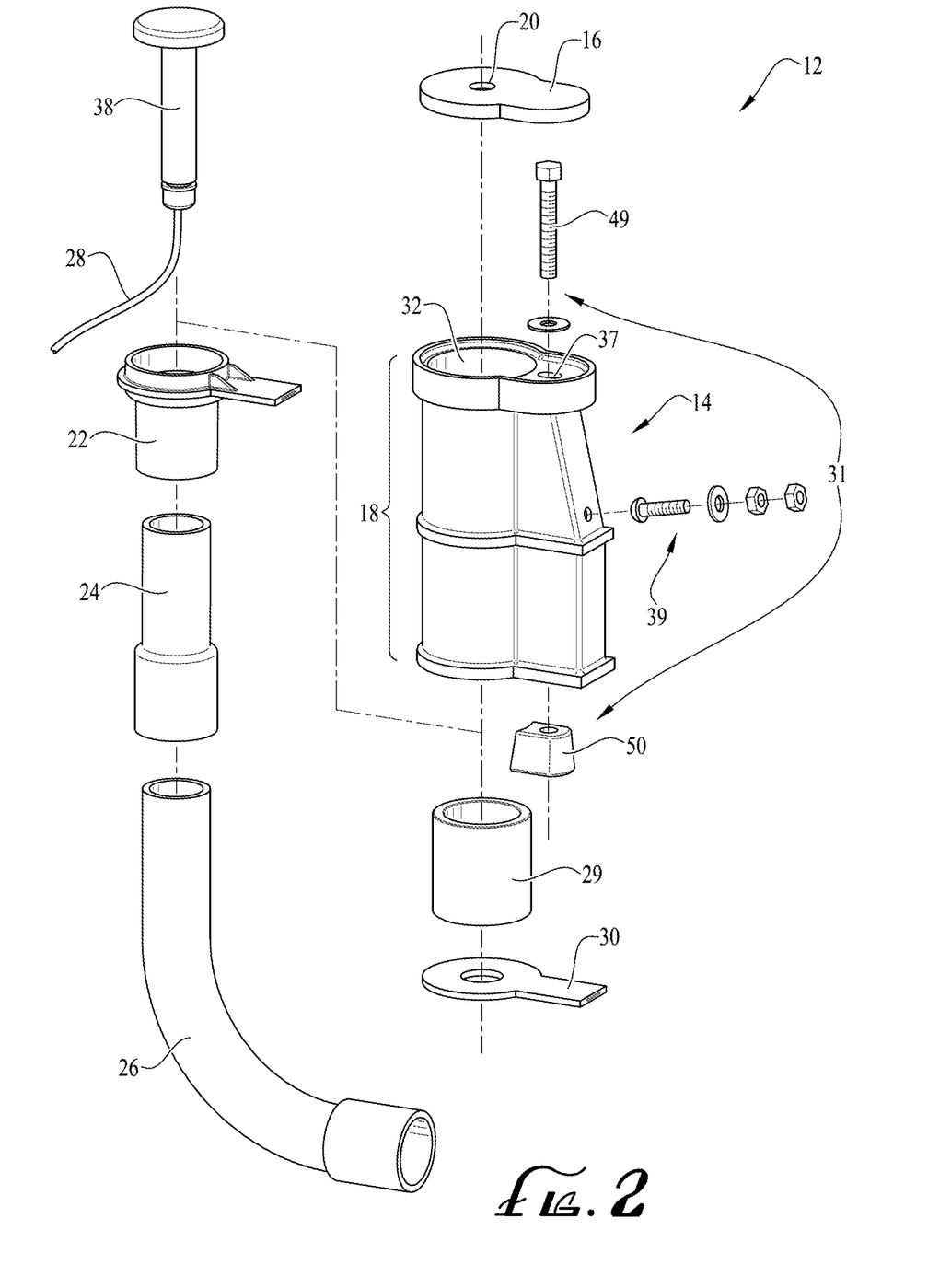
FIG. 2 is an exploded view of the anchor assembly shown in FIG. 1.

FIGS. 1 and 2 show an anchor assembly 12 including a power-supply housing receptacle 14. Power-supply housing receptacle 14 includes a removable top cover 16 and a tubular body portion 18.

Top cover 16 covers the interior of tubular body portion 18 when an accessory is not anchored by receptacle 14. Top cover 16 is removable from receptacle 14. In some embodiments, top cover 16 includes an aperture 20 which aids in removal of the cover from receptacle 14 and placing of the cover on receptacle 14.

In some embodiments, an accessory (see e.g., FIG. 3) inserted into tubular body portion 18 is a powered accessory configured to receive power from inductive coupling components mounted in receptacle 14. Tubular body portion 18 secures the powered accessory in receptacle 14 such that electrical power is provided to the powered accessory. Accordingly, tubular body portion 18 is configured to receive a pool or water-feature accessory that is anchored to a deck or wall by receptacle 14. Tubular body portion 18 is sized such that both powered and non-powered accessories can be secured within receptacle 14. Tubular body portion 18 is also sized such that accessories having circuitry, pumps, and other electrical or mechanical devices configured for use in a high-moisture operating environment can be engaged by receptacle 14.

Receptacle 14 is itself attachable to tubing, piping, or related adapters using a heatsink mount 22 that is aluminum. In FIG. 1, adapter 24 is inserted into mount 22, and tubing 26 is inserted into adapter 24. However, mount 22, adapter 24, and conduit tubing 26 may be coupled to each other in various other ways in accordance with embodiments of this disclosure. Moreover, mount 22 can be attached directly to tubing 26 without adapter 24. In some embodiments, adapter 24 and tubing 26 house cable 28 that provides electricity to a power supply located within receptacle 14. In some embodiments, adapter 24 and tubing 26 include optional and configurable conduit fittings, which are described further in this disclosure. In some embodiments, one or more of mount 22, adapter 24, tubing 26, cable 28, and optional and configurable conduit fittings are configured to allow for the installation of receptable 14 in existing receptacle conduits with no or minimal additional parts.

Figure 3:
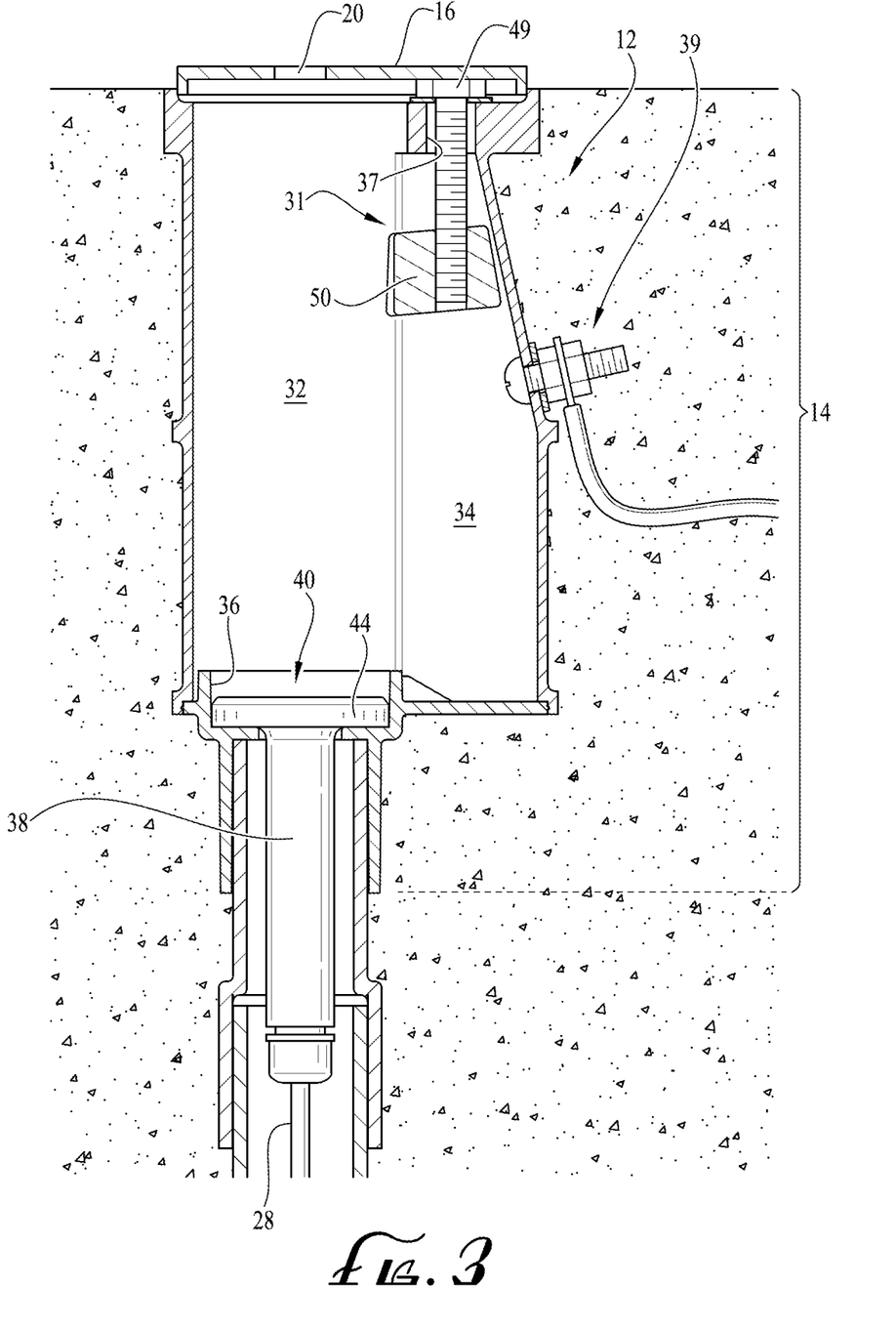
FIG. 3 is a cross-sectional view of the anchor assembly of FIG. 1 with a top cover covering the opening.

FIGS. 2 and 3 show additional internal details of anchor assembly 12. For example, FIG. 2 shows an optional bushing 29 may be fitted in mount 22 for securing smaller diameter accessories. And an optional flat mount 30 may be used as a substitute for mount 22 in non-powered applications. FIGS. 2 and 3 also show a wedge-block system 31, which is explained later with reference to FIG. 4.

With reference to FIG. 3, tubular body portion 18 of powered receptacle 14 includes an engagement compartment 32, a side compartment 34, and a coupling portion 36. In some embodiments, side compartment 34 allows fluid (e.g., water) ingress into receptacle 14, which also provides heat dissipation and cooling within receptacle 14. For example, fluid may be received by channel 37 in receptacle 14, which allows the flow of fluid into side compartment 34.

Engagement compartment 32 is configured to receive an accessory (see, e.g., FIGS. 4 and 5) inserted into receptacle 14. Coupling portion 36 houses a power supply 38, such as the PowerPass T-shaped inductive supply described in the '615 publication as providing concentric coils in confronting planes (c.f., matable, solenoid-style couplers described in the '964 patent) for a low-profile height.

Side compartment 34 is rectangular in shape toward its bottom. It transitions to a tapered trapezoid shape that houses a lower portion of wedge-block system 31 and a ground wire system 39.

Coupling portion 36 defines a recessed cavity 40 in which an upper T-shaped portion 41 of power supply 38 is nested and hung. In some embodiments, coupling portion 36 is configured to hold power supply 38 in proper alignment with power electronics of the powered accessory being powered by supply 38. In some embodiments, power supply 38 is an inductive power supply that transfers one or both of power and data wirelessly to an accessory inserted into receptacle 14, and thus the power supply 38 is an inductive power transmitter. Power supply 38 can include a printed circuit board assembly (PCBA) having circuitry for one or both the power and data transfer. Further details regarding wireless power and data transfer associated with embodiments of the present disclosure are discussed are discussed in the '615 publication.

Figure 4:
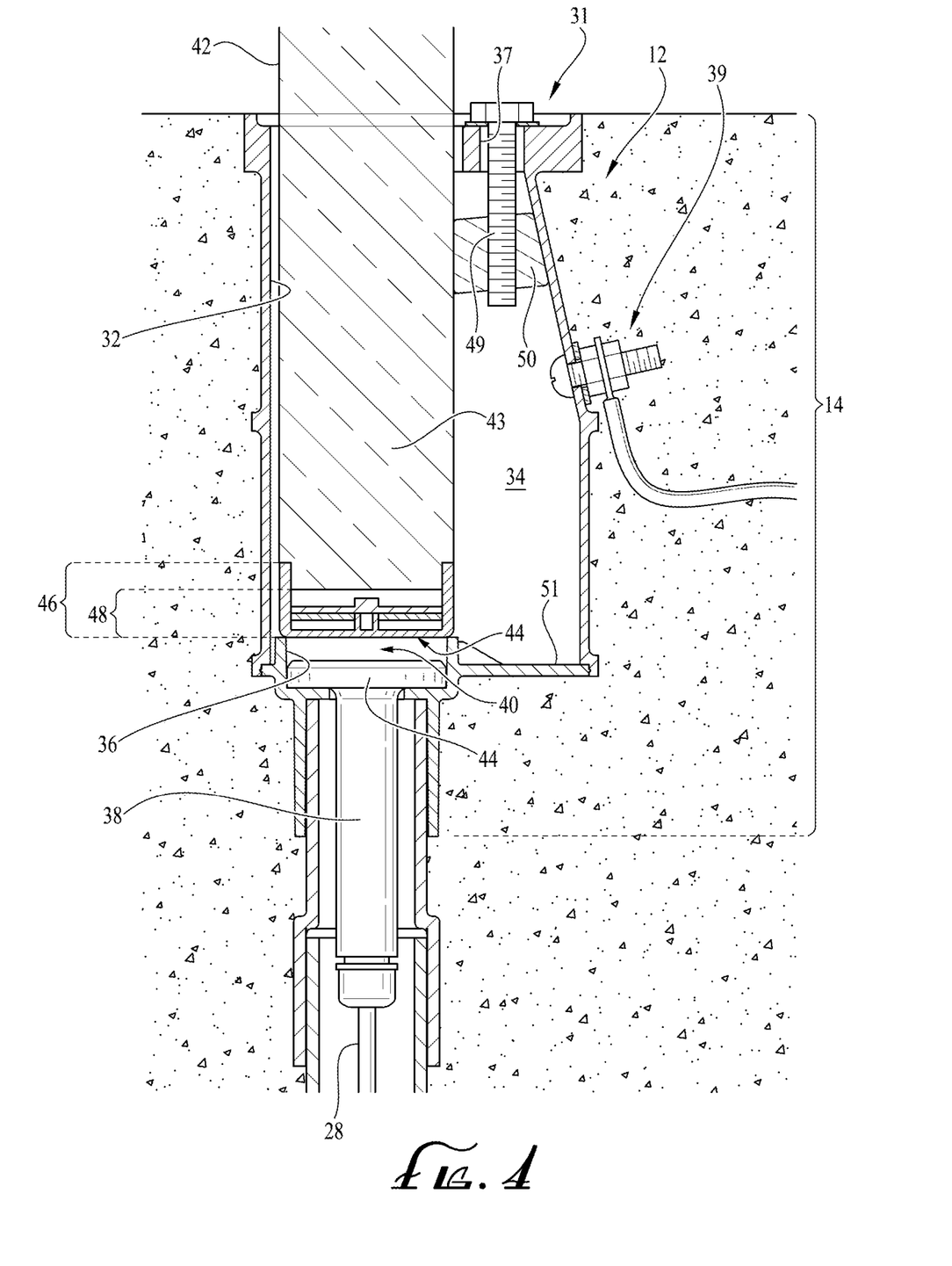
FIG. 4 is another cross-sectional view of the anchor assembly of FIG. 1 showing the top cover removed and an accessory inserted into the anchor assembly.

FIG. 4 shows an accessory 42 having an anchorable shaft 43 (e.g., an illuminated, light-transmissive acrylic tube) inserted into receptacle 14 in accordance with embodiments of the present disclosure. For example, anchorable shaft 43 is a table leg, chair leg, stool leg, or any other type of supporting leg for a table, seating structure, aquatic recreation equipment (e.g., illuminated basketball hoop or scoreboard), or other devices. In some embodiments, accessory 42 is a powered accessory that includes electrical circuitry. In some embodiments, accessory 42 is acrylic. In some embodiments, accessory 42 is a pedestal.

As shown in FIG. 4, engagement compartment 32 secures accessory 42 in receptacle 14 such that accessory 42 is mechanically stabilized. In some embodiments, anchorable shaft 43 includes at its base 44 an end cap 46 housing electrical circuitry 48. In some embodiments, electrical circuitry 48 is a printed circuit board assembly. In some embodiments, electrical circuitry 48 includes power circuitry configured to receive wireless power from supply 38 and provide power to other parts of electrical circuitry 48. In some embodiments, electrical circuitry 48 includes inductive coils for receiving wireless power from supply 38, and thus the electric circuitry 48 is an inductive power receiver. Thus, power transfer between power supply 38 within receptacle 14 and the powered accessory is reliably established. For example, connectivity between power supply 38 and the powered accessory is effectuated by electromagnetic inductive coupling for wireless (contactless) connectivity. Accessory 42 is thereby electrically powered and secured by receptacle 14.

Engagement compartment 32 is also configured to damper vibrations associated an accessory it secures as well as its surrounding environment. For example, as threaded fastener 49 is turned it pulls a resilient rubber wedge block 50 of wedge-block system 31 upward to wedge it between a sidewall of accessory 42 and a sidewall of side compartment 34, and thereby affix accessory 42 inside engagement compartment 32. This reduces movement of accessory 42 so as to stabilize it within receptacle 14, and thus the block 50 is a retainer. Thus, the accessory securing provided by engagement compartment 32 improves both wireless power transmission, as well as wireless data transmission that is configured to occur between the powered accessory and a power supply 38 or another component associated with receptacle 14 configured for data transmission with a powered accessory.

In some embodiments, wireless connectivity includes infrared connectivity. In some embodiments, wireless connectivity includes one- or two-way communication. For example, receptacle 14 is configured to support improved wireless communication with a powered accessory by providing proper alignment between the communicating component of receptacle 14 and communicating component of the powered accessory. For example, using wireless communication, usage characteristics (e.g., one or more of hours operated, power consumption, etc.) of accessories secured by receptacle 14 could be tracked, etc. Additional details of communication schemes and signaling protocols are described in the '964 patent and other literature available from S.R. Smith, LLC.

In some embodiments, securing a powered accessory in receptacle 14 provides improved safety in high-moisture environments since receptacle 14 is configured to combat against moisture interfering with electronic components within the receptable and powered accessory. Moreover, in some embodiments, receptacle 14 provides a location to secure powered devices that should not be in contact with water bodies such as a pool or tub. For example, one may ordinarily not want a certain powered accessory near a water body over concern that it would end up in the water body, potentially causing harm due to electrical shock. But because the powered accessory is secured in the receptacle, chances of accidental contact with the water body by the powered accessory is reduced.

In some embodiments, side compartment 34 acts as a cooling plenum by providing an area to assist in heat dissipation from receptacle 14. For example, side compartment 34 is an area configured to house an elongate section 51. Elongate section 51 is in the form of a tab extending from heatsink mount 22 (or other heat dissipating device, e.g., a finned cooling heatsink) on a bottom surface of side compartment 34. Accordingly, side compartment 34 is used to aid in dissipation of heat from a powered accessory secured by receptacle 14, such as a light or a powered device. By providing heat dissipation, longevity and lifespan, as well as safety, of powered accessories secured by receptacle 14 is improved.

In some embodiments, electrical circuitry 48 includes lighting circuitry that causes accessory 42 to illuminate when it is powered by wireless power from supply 38 of receptacle 14. In some embodiments, electrical circuitry 48 includes data transfer circuitry which is configured to receive data, such as control data, from supply 38 or another data transmission component. In some embodiments, control data directs how electrical circuitry 48 functions. In some embodiments, light emitting diodes (LEDs) are arranged such that they direct emitted light within accessory 42. For example, control data causes lighting circuitry to illuminate accessory 42 in various colors. Further details regarding wireless power and data transfer associated with embodiments of the present disclosure are discussed in the '615 publication.

Figure 5:
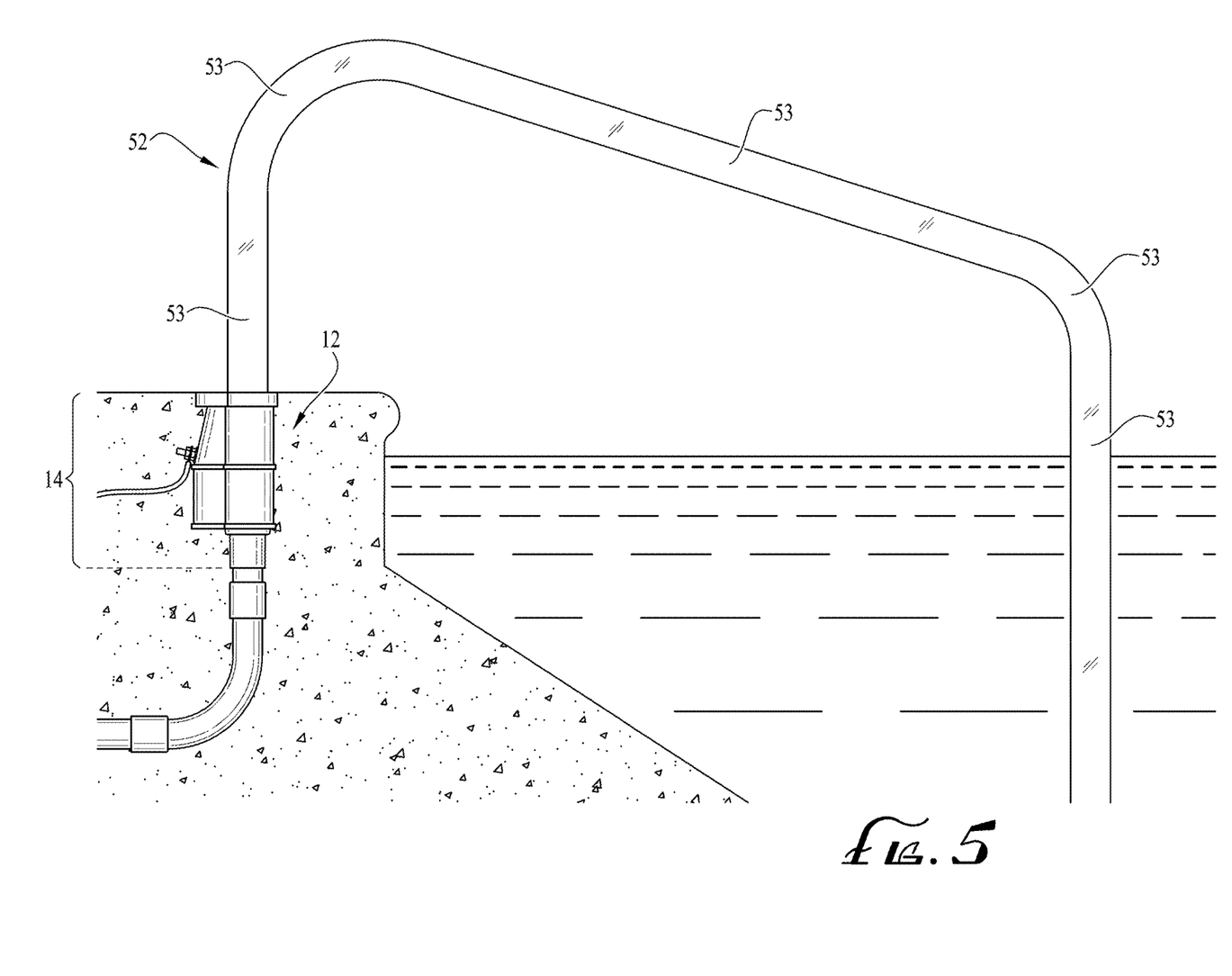
FIG. 5 is a side elevation view of the anchor assembly of FIG. 4, showing the anchor assembly installed in a pool deck or slab for anchoring an illuminated handrail.

FIG. 5 shows another accessory 52 inserted into receptacle 14. For example, accessory 52 is a railing, such as a handrail, guardrail, or any other type of railing structure. In some embodiments, accessory 52 is acrylic or other light-guiding material. In some embodiments, accessory 52 is formed from one or more parts 53. Parts 53 include, for example, curved and straight railing parts. Parts 53 may have various lengths and thicknesses.

In some embodiments, accessory 52 includes end cap 46 (FIG. 4) electrical circuity 48 as described previously for receiving wireless power from supply 38. In some embodiments, electrical circuitry 48 includes lighting circuitry that causes accessory 52 to illuminate when it is powered by wireless power from supply 38 of receptacle 14. In some embodiments, electrical circuitry 48 includes data transfer circuitry which is configured to receive data, such as control data, from supply 38. In some embodiments, control data directs how electrical circuitry 48 functions. For example, control data causes lighting circuitry to illuminate accessory 52 in various colors. Further details regarding wireless power and data transfer associated with embodiments of the present disclosure are discussed in the '615 publication.

In some embodiments, an accessory is a powered accessory that includes electrical circuitry, such as that for a luminaire or a illuminated tile or paver. For example, an acrylic tile (or similar translucent material) would have on its bottom side a male portion of the PowerPass connection described in the '615 publication, appropriately sized to fit down into receptacle 18. The tile would then be lit like a regular light to provide a walkway of same or different colors, color-changing shows, and other illumination schemes.

Embodiments of the present disclosure further related to use of receptacle 14 to provide a self-contained water feature. For example, traditional water features include an installed plumbing infrastructure and connection to a water circulation system to create a desired water effect. In contrast, embodiments of the present disclosure use receptacle 14 to provide a self-powered water feature (e.g., a bubbler secured and powered by receptacle 14) that produces a water effect without needing connection to a plumbing infrastructure. An example of components of a self-contained water feature in accordance with embodiments of the present disclosure is described with reference to FIGS. 6-8.

Figure 6:
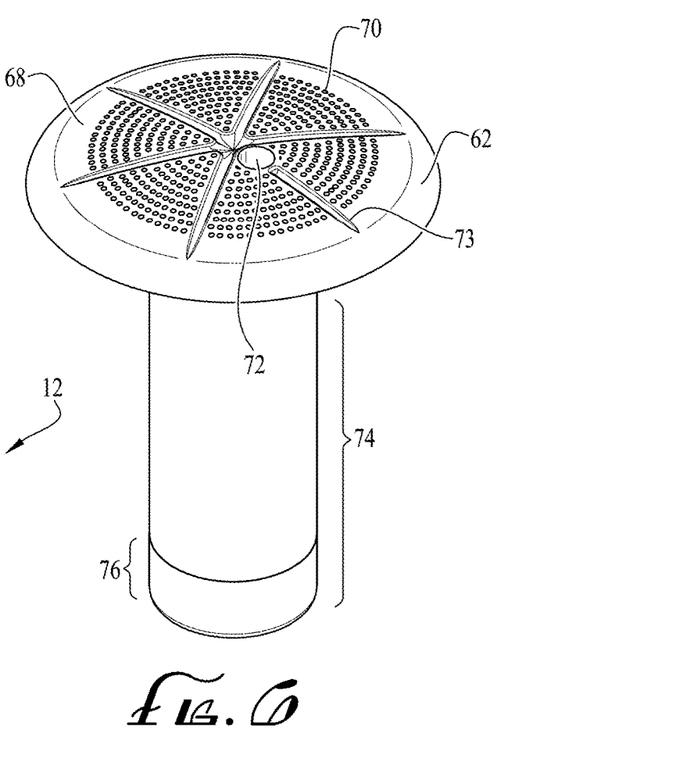
FIG. 6 is an isometric view of a bubbler accessory preparatory to insertion into the anchor assembly.

FIG. 6 shows a bubbler accessory 62. In some embodiments, bubbler accessory 62 is a motorized bubbler for water features that provides fountain effects and water circulation. Bubbler accessory includes a head 68 having one or inlets 70 configured to draw water into accessory 62 and outlets 72 configured to extinguish water out of accessory 62. In some embodiments, bubbler accessory 62 includes a conduit 73 configured to allow water flow into and/or out of channel 35 of receptacle 14. In some embodiments, bubbler accessory 62 includes an insertable portion 74 configured for insertion into receptacle 14. Insertable portion 74 includes an end cap 76 that houses electrical circuitry configured to power accessory 62.

Figure 7:
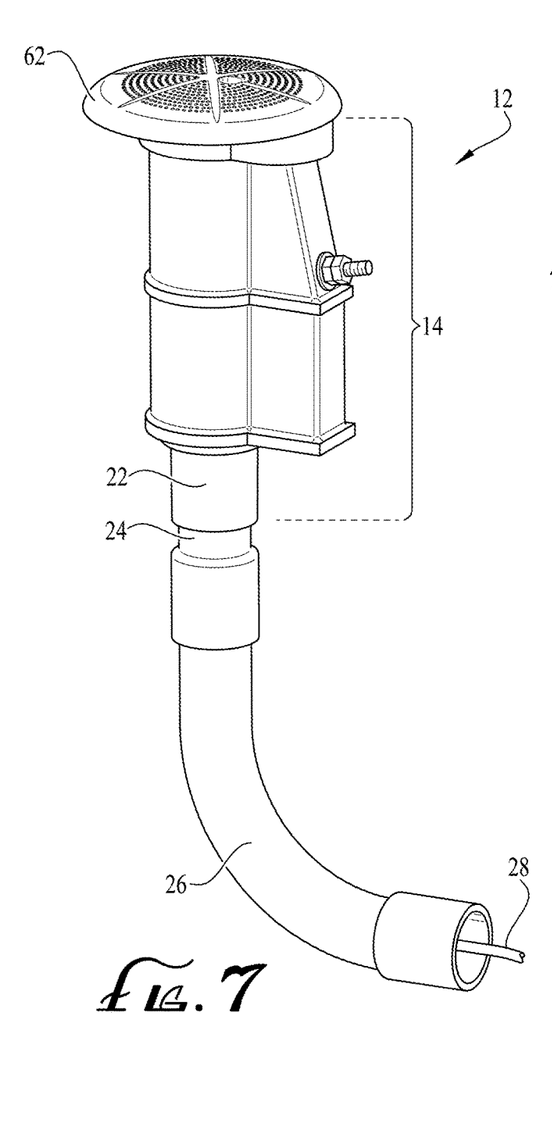
FIG. 7 is an isometric view of the bubbler accessory inserted into the anchor assembly.
Figure 8:
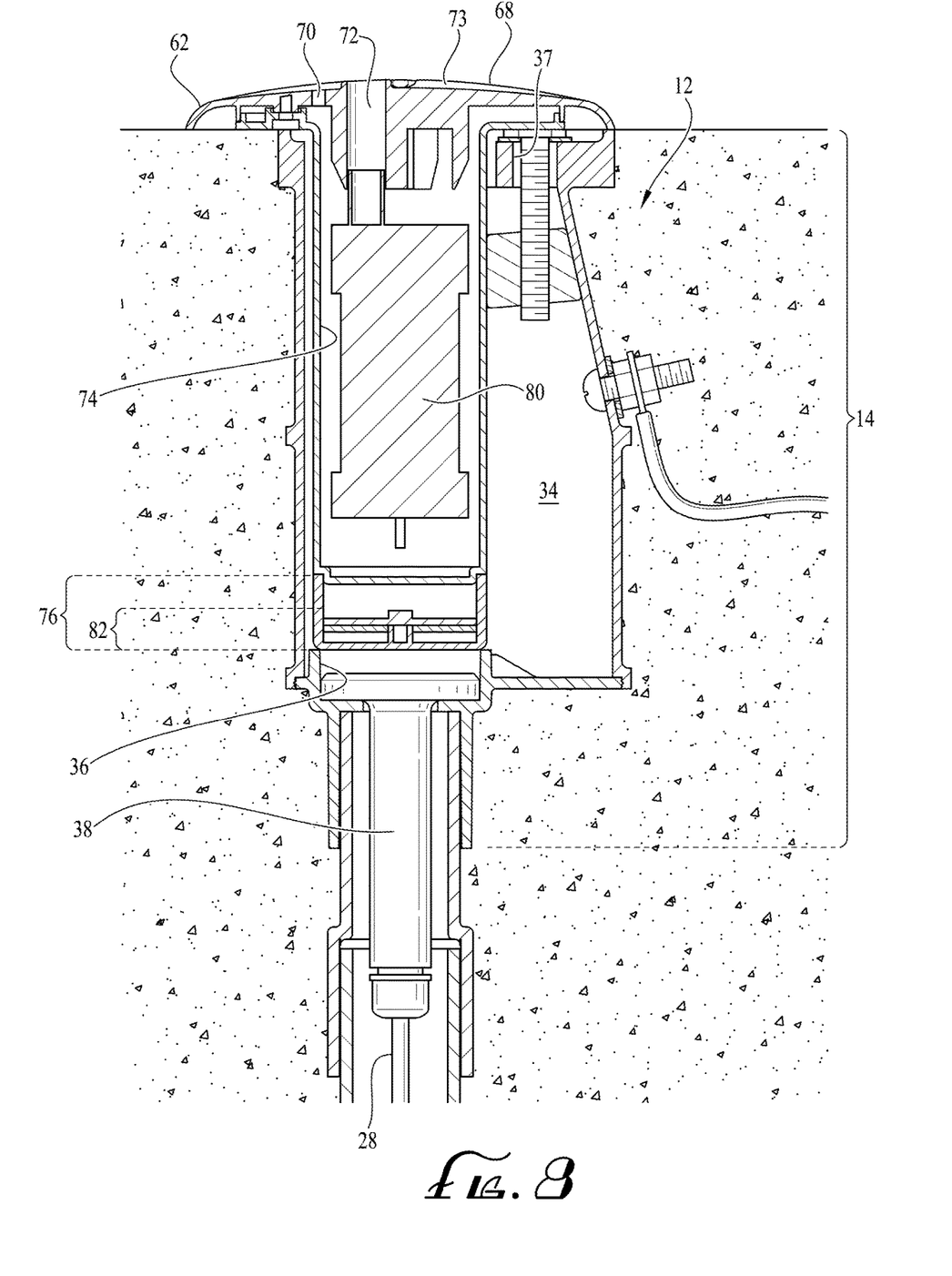
FIG. 8 is a cross-sectional view of the bubbler accessory shown in FIG. 7, showing details of the interior of the anchor assembly after insertion of the bubbler accessory into the anchor assembly.

FIGS. 7 and 8 show bubbler accessory 62 inserted into receptacle 14 in accordance with embodiments of the present disclosure. In some embodiments, insertable portion 74 of bubbler accessory 62 is inserted into engagement compartment 32 of receptacle 14.

FIG. 8 shows that, in some embodiments, end cap 76 of accessory 62 houses electrical circuitry 82. In some embodiments, electrical circuitry 82 is a printed circuit board assembly. In some embodiments, end cap 76 is a sealed enclosure that resists water, dirt, and other contaminants to electrical circuitry 82. In some embodiments, electrical circuitry 82 includes power circuitry configured to receive wireless power from supply 38 and provide power to other parts of electrical circuitry 82. In some embodiments, electrical circuitry 82 includes inductive coils for receiving wireless power from supply 38. Supply 38 can also be referred to as a power pass.

In some embodiments, bubbler accessory 62 includes a pump 80 located within insertable portion 74. Pump 80 is configured to draw in water via water inlet 70 and extinguish water via pump outlet 72. In some embodiments, pump 80 is powered by electrical circuitry 82 of end cap 76. In some embodiments, control circuitry of electrical circuitry 82 controls pump 80 such that it draws in and extinguishes water in accordance with one or more of a certain rate, intensity, and pattern. In some embodiments, electrical circuitry 82 includes data transfer circuitry which is configured to receive data, such as control data, from supply 38. In some embodiments, control data directs how control circuitry of electrical circuitry 82 functions. For example, control data causes control circuitry to direct pump 80 to draw in and extinguish water at one or more of a certain rate, intensity, and pattern. Further details regarding wireless power and data transfer associated with embodiments of the present disclosure are discussed in the '615 publication.

Skilled persons will appreciate in light of this disclosure that many changes may be made to the details of the above-described embodiments without departing from the underlying principles suggested herein. For example, other inductive couplers are also contemplated for use atop mount 22 or mount 30. The scope of the present invention should, therefore, be determined by the following claims.

The invention claimed is:

1. An anchor assembly for housing a power supply to wirelessly transfer power to devices in high-moisture operating environments, comprising:
   a mount forming a coupling portion for securing an inductive power receiver of a powered device, the mount including a recessed cavity in which an inductive power transmitter is at least partly nestable; and
   a body portion having an engagement compartment and a retainer, the engagement compartment having an opening opposite the mount, the opening sized to receive the inductive power receiver of the powered device, and the retainer configured to secure a side of the inductive power receiver such that it is retained in the engagement compartment, in which the anchor assembly is vertically oriented to allow the powered device to be plugged downward into the engagement compartment with the retainer ensuring that the inductive power receiver remains engaged when fastened.

2. The anchor assembly of claim 1, further comprising the inductive power transmitter having an upper T-shaped portion that is at least partly nestable in the recessed cavity.

3. The anchor assembly of claim 1, in which the inductive power receiver is made of a light-guiding material configured to illuminate via inductively powered LEDs disposed in the inductive power receiver.

4. The anchor assembly of claim 1, in which the inductive power receiver is part of a handrail.

5. The anchor assembly of claim 1, in which the inductive power receiver is part of a table leg.

6. The anchor assembly of claim 1, in which the inductive power receiver is part of a chair leg.

7. The anchor assembly of claim 1, in which the inductive power receiver is part of aquatic recreation equipment.

8. The anchor assembly of claim 7, in which the aquatic recreation equipment is a scoreboard.

9. The anchor assembly of claim 1, in which the inductive power receiver is part of a railing.

10. The anchor assembly of claim 1, in which the inductive power receiver is part of an illuminated tile or paver.

11. The anchor assembly of claim 1, in which the inductive power receiver is part of a pump housing for a water feature.

12. The anchor assembly of claim 1, in which the mount is a heatsink mount.

13. The anchor assembly of claim 12, in which the heatsink mount includes an elongate section.

14. The anchor assembly of claim 13, in which the elongate section forms a bottom surface.

15. The anchor assembly of claim 12, in which the body portion acts as a cooling plenum for the heatsink mount.

16. The anchor assembly of claim 1, further comprising a printed circuit board assembly (PCBA) within the inductive power receiver.

17. The anchor assembly of claim 16, in which the PCBA includes lighting circuitry configured to illuminate the inductive power receiver.

18. The anchor assembly of claim 16, in which the PCBA includes data transfer circuitry configured to receive data from the power supply.

19. The anchor assembly of claim 1, in which the body portion includes a channel allowing fluid to flow into the engagement compartment for cooling purposes.

20. The anchor assembly of claim 1, in which the inductive power receiver is part of a bubbler accessory.

21. The anchor assembly of claim 1, in which the inductive power transmitter is configured to confront a base of an anchorable shaft of the powered device.

22. The anchor assembly of claim 21, further comprising a side compartment sized to house a resilient wedge of a wedge-block system for anchoring the anchorable shaft in the engagement compartment.

* * * * *